United States Patent [19]

Shaffer

[11] 3,951,903

[45] Apr. 20, 1976

[54] MODIFIED POLYCARBONATE RESIN

[75] Inventor: John W. Shaffer, Williamsport, Pa.

[73] Assignee: GTE Sylvania Incorporated, Montoursville, Pa.

[22] Filed: Nov. 1, 1974

[21] Appl. No.: 519,964

[52] U.S. Cl. .................... 260/37 PC; 260/45.85 R; 260/45.85 B; 260/45.85 T; 260/45.8 A; 260/45.9 QB; 260/45.7 PH; 260/47 XA
[51] Int. Cl.² .............................. C08J 3/20
[58] Field of Search ............... 260/37 PC, 45.9 QB, 260/45.85, 45.8 A, 47 XA

[56] References Cited
UNITED STATES PATENTS

| 3,053,810 | 9/1962 | Griehl et al. | 260/47 |
| 3,213,059 | 10/1965 | Deanin et al. | 260/37 |
| 3,213,060 | 10/1965 | Jackson et al. | 260/47 |
| 3,220,975 | 11/1965 | Fox | 260/47 |
| 3,261,808 | 7/1966 | Schnell et al. | 260/47 |
| 3,274,156 | 9/1966 | Perry et al. | 260/47 |
| 3,290,409 | 12/1968 | Munro | 260/47 |
| 3,322,719 | 5/1967 | Peilstocker | 260/47 |
| 3,404,122 | 10/1968 | Fritz et al. | 260/47 |
| 3,492,268 | 1/1970 | Baker | 260/47 |
| 3,635,895 | 1/1972 | Kramer | 260/47 XA |
| 3,763,063 | 10/1973 | Factor | 260/47 |

Primary Examiner—V. P. Hoke
Attorney, Agent, or Firm—Edward J. Coleman

[57] ABSTRACT

A polycarbonate resin having an acidic additive for providing improved resistance to stress cracking under humid conditions while retaining tensile and impact strength at elevated temperatures.

6 Claims, No Drawings

MODIFIED POLYCARBONATE RESIN

CROSS-REFERENCE TO RELATED APPLICATION

Use of the modified resin of the present invention as a protective coating for a photoflash lamp is disclosed and claimed in copending application Ser. No. 516,966 filed concurrently herewith in the name of the present inventor and assigned to the present assignee.

BACKGROUND OF THE INVENTION

This invention relates to polycarbonate resins and, more particularly to an improved polycarbonate resin having prolonged time to failure under conditions of high humidity and mechanical stress.

Polycarbonate resins are polymeric materials which incorporate the carbonate radical

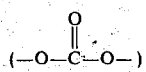

as an integral part of the main polymer chain. In polycarbonate synthesis, a dihydroxy aromatic compound undergoes reaction with a carbonyl compound to yield long chain molecules which consist of alternate aromatic and carbonate groups. An example of such polyarylcarbonate resin is the product of the reaction between phosgene and 2,2-bis(4-hydroxyphenyl) propane (bisphenol A) in the presence of a basic substance such as pyridine. The structure of this polymer is:

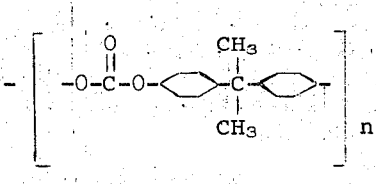

In commercial polycarbonate resins, the number of repeating units $n$, is such that the molecular weight is from about 25,000 to 75,000.

Polycarbonates are found to be particularly useful in a number of applications because of the relatively high impact and tensile strengths and high softening temperatures exhibited by such resins. For example, U.S. Pat. No. 3,156,107 describes the use of polycarbonate resin to provide a stronger and more heat-resistant exterior coating on the glass envelope of a photoflash lamp; and U.S. Pat. No. 3,770,366 describes a photoflash lamp having a thick, vacuum-formed outer coating of a high-strength thermoplastic, such as polycarbonate resin. Heat is employed in thermoforming process used in applying these coatings to the lamp envelopes. Subsequent cooling of the glass envelope and polycarbonate coating causes the buildup of high tensile forces in the coating because it tends to contract more than the glass. These forces can be reduced somewhat by heating a narrow band of the coating as described in U.S. Pat. No. 3,832,257. It has been found, however, that even such stress relieved coatings can crack and fail in a relatively short time under conditions of high humidity, even when the remaining stresses are within the accepted design limits for the polycarbonate resin used. It should be noted here that unstressed polycarbonate has good resistance toward humidity or even water immersion. In searching for a solution to this aging, or shelf-life, problem under humid conditions, an extensive literature survey failed to shed light on the cause of this unexpected cracking under stress levels allowed by good design practices.

Consideration was then given to the incorporation of a compatible plasticizer into the resin with the anticipation that it might promote relaxation and stretching and thereby relieve the stresses caused by differential contraction between the coating and glass. Evaluation of coatings containing, for example, 20 to 30 parts of a plasticizer to 100 parts of resin did in fact show significantly improved life under humid conditions. The plasticized polycarbonate was quite rigid rather than extensible as had been expected and, therefore, did not function in the manner anticipated. That is, the reduced coating stresses obtained with the plasticized resin were the result of a considerable lowering of the softening temperature needed for thermoforming. Cooling of the coated lamp over a lesser temperature gradient resulted in less stress build up. The shortcoming of this approach, however, was that the introduction of the required amounts of plasticizer resulted in substantial weakening of the coating, when compared to unplasticized polycarbonate. The resulting plasticized polycarbonate did not provide the desired stronger protective coating; more specifically, the plasticized polycarbonate coatings were not consistently better than cellulose acetate lacquer in containment tests with overcharged lamps. In addition, with respect to the preformed polycarbonate sleeves which are vacuum-formed onto the lamp as described in U.S. Pat. No. 3,832,257, the low set point and poor strength at elevated temperatures of the plasticized polycarbonate made extraction from the mold of the injection molded sleeves, a difficult, slow and uneconomical process.

SUMMARY OF THE INVENTION

In view of the foregoing, it is an object of this invention to provide a modified polycarbonate resin which retains the toughness and high softening temperature for which polycarbonate is known, but which affords substantially improved resistance toward stress cracking under humid conditions.

It is a particular object of the invention to provide an improved polycarbonate resin which exhibits a prolonged time to failure under conditions of high humidity and high mechanical stress.

A further object is to provide a modified polycarbonate resin which exhibits improved aging characteristics particularly when employed in contact with glass under conditions of high humidity and mechanical stress, while retaining a high mechanical strength.

These and other objects advantages and features are attained in accordance with the invention, wherein it has been found that a significant improvememt in stressed-part humidity tolerance can be achieved by blending a compatible acidifying agent into the polycarbonate resin. By deliberately rendering the resin acidic, rather than neutral, the time to crack development can be extended significantly. Whereas the actual time to failure is influenced by stress level, temperature and humidity, the lifetime ratio of acidified to nonacidified polycarbonate appears to be relatively constant under diverse conditions of testing.

DESCRIPTION OF THE INVENTION

It is hypothesized that stress cracking of the polycarbonate under humid conditions is accompanied by localized scission of the polymer chains due to a hydrolytic mechanism. Small traces of alkali, either in the resin or its environment, appear to greatly accelerate this hydrolytic mechnanism and probably act by way of basic catalysis. It has been shown that sufficient alkali is released from glass, as for example a lamp envelope, to measurably promote such failure of the polycarbonate in the presence of moisture. By adding an acidifying agent to the polycarbonate resin in accordance with the invention, a dramatic improvement in humidity tolerance is obtained which may be explained on the basis of the additive reacting with and thereby eliminating the traces of catalytic alkali that enter the resin.

As a preferred acidifying agent, I have found phthalic anhydride to offer effective hydrolytic stabilization to polycarbonate resins while at the same time providing high transparency, freedom from discoloration or haze, and good retention of thermal and mechanical properties. However, many other acids and acid anhydrides that are soluble or dispersible in polycarbonate resin may be used. In applications such as flashlamp coatings, where a high degree of optical transparency is required, a truly soluble agent, such as phthalic anhydride is needed. For applications where optical clarity is not required, as, for example, in glass fiber reinforced polycarbonate, an acidifying agent of somewhat lesser solubility in the resin may prove acceptable.

The quantity of acidifying agent used may be varied from about 0.1 percent to as much as 30 percent by weight in the modified polycarbonate resin, depending on end use requirements. That is, the modified resin may comprise a homogeneous mixture of from about 70 to 99.9 percent by weight of a polycarbonate resin and from about 0.1 to 30 percent by weight of a compatible acidifying agent. At very low concentrations, the acidic additive will serve to insure freedom from harmful residual traces of alkali in the resin itself; however, protection from externally introduced alkali, as, for example, from contact with a substance such as glass, will be inconsequential. At very high concentrations of additive, the alkali tolerance is increased, but the thermal and mechanical properties will suffer somewhat, as was found with plasticized polycarbonate. For flashlamp coating applications, an acidifying agent concentration from about 0.5 to 1.5 percent by weight is deemed optimal.

The choice of acid or acid anhydride for the desired protective effect is not considered critical and many such substances could be used interchangeably. More specifically, an acid or anhydride of an acid having a first ionization pKa value in a range of from about 1.0 to 6.5 will function within the spirit of the invention, provided the agent chosen is soluble in or compatible with the polycarbonate resin so as to give a homogeneous mixture with the degree of optical clarity required by the application, i.e., a non-optical application can tolerate some haziness or milky appearance. Acidifying agents with a pKa value between 1.5 and 4.5 are preferred because of their greater effectiveness or ability to maintain the resin acidic at low concentrations and/or after being largely depleted through reaction with alkaline materials.

By way of example, the following is a list of acidifying agents that would appear suitable for use as an additive to modify polycarbonate resin in accordance with the invention, keeping in mind the above-mentioned provision that all the possible additives will not necessarily be suitable for the same specific application.

| Additive | (First Ionization) pKa |
|---|---|
| o-bromobenzoic acid | 2.84 |
| chloroacetic acid | 2.85 |
| dichloroacetic acid | 1.48 |
| benzoic acid | 4.19 |
| o-hydroxybenzoic acid | 2.97 |
| maleic anhydride | (acid 1.83) |
| phthalic anhydride | (acid 2.89) |
| α-naphthoic acid | 3.70 |
| octanoic acid | 4.89 |
| phenylacetic acid | 4.28 |
| trihydroxybenzoic acid (2,4,6-) | 1.68 |

The modification of polycarbonate resin as described herein above has been found to be particularly useful in applications where catalytic traces of alkali are present as, for example, when the resin is in contact with or reinforced with glass. Hence, the invention may take the form of a homogeneous mixture of polycarbonate resin and acidifying agent with reinforcing glass fibers dispersed throughout the mixture. Another particularly useful application for the modified resin is the previously discussed protective coating for photoflash lamps. The significant advantages attained include substantially improved tolerance to humid environments without at the same time destroying the good tensile and impact strength at elevated temperatures which make polycarbonate a particularly desirable material for many applications. Use of the modified resin permits significant increases in the life expectancy of stressed polycarbonate parts that are subjected to humid environments.

Although the invention has been described with respect to specific embodiments, it will be appreciated that modifications and changes may be made by those skilled in the art without departing from the true spirit and scope of the invention.

What I claim is:

1. A polycarbonate resin modified to counteract any alkali-catalyzed hydrolysis of the resin to thereby prolong the time to failure of said resin under conditions of high humidity and high mechanical stress, said modified resin consisting essentially of a homogeneous mixture of from about 70 to 99.9 percent by weight of a polycarbonate resin and from about 0.1 to 30 percent by weight of a compatible acidifying agent consisting of an organic carboxylic acid having a first ionization pKa value in a range of from about 1.0 to 6.5 or an anhydride thereof.

2. The modified polycarbonate resin of claim 1 wherein said acidifying agent is soluble or dispersible in said polycarbonate resin.

3. The modified polycarbonate resin of claim 2 wherein said acidifying agent has a first ionization pKa value between about 1.5 and 4.5.

4. The modified polycarbonate resin of claim 3 wherein said acidifying agent is phthalic anhydride.

5. The modified polycarbonate resin of claim 1 wherein said acidifying agent is at least one member selected from the group consisting of o-bromobenzoic acid, chloroacetic acid, dichloroacetic acid, benzoic acid, o-hydroxybenzoic acid, maleic anhydride, phthalic anhydride, α-naphthoic acid, octanoic acid, phenylacetic acid, and (2,4,6-) trihydroxybenzoic acid.

6. The modified polycarbonate resin of claim 1 further including reinforcing glass fibers dispersed throughout said modified resin.

* * * * *